(No Model.) 2 Sheets—Sheet 1.

H. D. SMITH & F. M. WALKER.
TRACTION ENGINE.

No. 379,996. Patented Mar. 27, 1888.

Henry D Smith,
Francis M Walker,
INVENTORS,

BY D.C. Ridout & Co.
ATTORNEYS.

(No Model.) 2 Sheets—Sheet 2.

H. D. SMITH & F. M. WALKER.
TRACTION ENGINE.

No. 379,996. Patented Mar. 27, 1888.

Henry D Smith,
Francis M Walker,
INVENTORS.

BY D C Ridout & Co
ATTORNEYS.

WITNESSES:

UNITED STATES PATENT OFFICE.

HENRY D. SMITH AND FRANCIS M. WALKER, OF NEWARK, OHIO.

TRACTION-ENGINE.

SPECIFICATION forming part of Letters Patent No. 379,996, dated March 27, 1888.

Application filed January 14, 1888. Serial No. 260,731. (No model.)

*To all whom it may concern:*

Be it known that we, HENRY D. SMITH and FRANCIS M. WALKER, citizens of the United States, residing at Newark, in the county of Licking and State of Ohio, have invented certain new and useful Improvements in Traction-Engines, of which the following is a specification, reference being had to the accompanying drawings.

The object of this invention is to provide traction-engine driving-gear—such as is shown in the Patent No. 357,431, issued February 8, 1887, to Francis M. Walker—with a device by which it may have two different speeds and two different powers, so that in traveling uphill, for instance, the traction-engine, with the same speed of piston, may travel slower with increased power.

Figure 1:
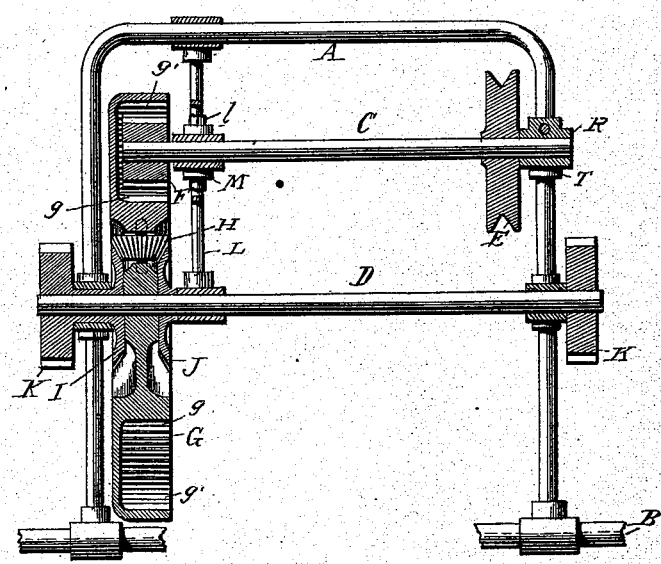
Figure 2:
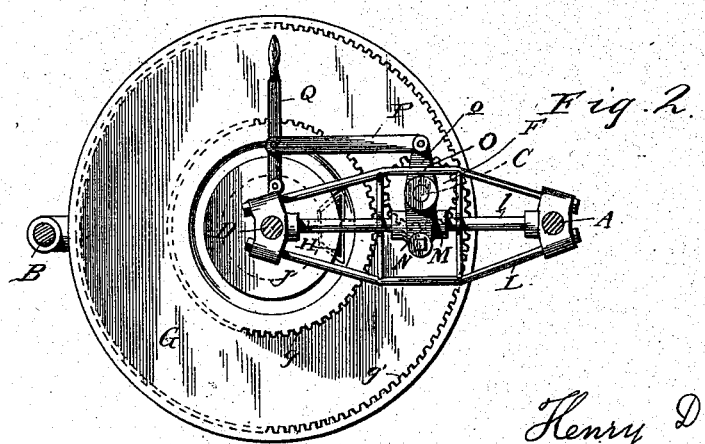
Figure 3:
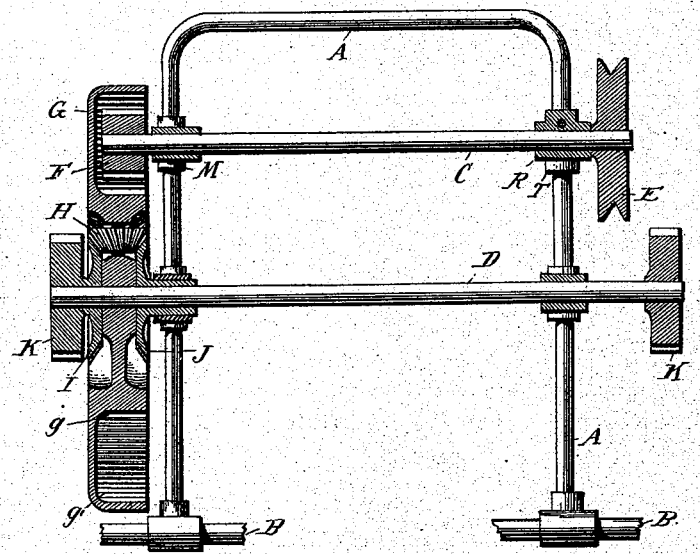
Figure 4:
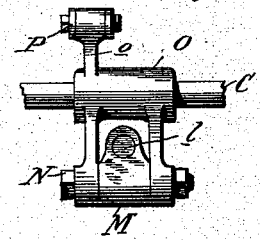
Figure 5:
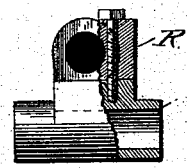

In the accompanying drawings, Figure 1 represents a horizontal section of the frame of a traction-gearing such as is shown in the aforesaid patent. Fig. 2 is a vertical section through the line $x\ x$ in Fig. 1. Fig. 3 is a horizontal section of a modification. Figs. 4 and 5 are details showing moving boxes, whose object will be hereinafter more fully described.

Referring now to the details of the drawings, A represents the main frame of the traction-gear; B, the main axle thereof, running in boxes in said frame, which frame also carries the counter-shafts C D. The shaft C carries on one end a pulley, E, which receives motion from a connection, preferably by means of a belt or chain, with the steam-engine, and its other end carries a pinion, F, which meshes with the teeth of a wheel, G, and gives motion to the same. The wheel G is mounted on the shaft D, and carries a bevel-pinion, H, meshing with the bevel-wheels I J, also mounted on the shaft D, and operating in a manner well understood, and therefore unnecessary to describe. The shaft D also carries the pinions K, which mesh with internal gear-wheels formed with or supported by the carrying-wheels, (not shown,) which are mounted on the main axle B.

All the parts so far described are substantially the same as those shown in the aforesaid Patent No. 357,431, except that the wheel G is formed with two sets of teeth, $g$ and $g'$, while the corresponding wheel in the patent referred to has only one set of teeth.

To enable us to use the two sets of teeth on the wheel G, we so mount the shaft C that it is capable of a slight lateral motion, sufficient, however, to move the pinion F out of gear with the teeth $g$ and into gear with the teeth $g'$, or the reverse, as desired. This we accomplish by means of a small truss-frame, L, which carries a sleeve, M, firmly secured on the central rod, $l$, of said truss-frame, and supporting a bolt, N, on which a movable box, O, carrying the shaft C, rocks. The upper end of this box O carries an arm, $o$, that is connected by a link, P, to a lever, Q, so that by moving said lever Q in one direction the pinion F may be made to mesh with either the teeth $g$ or $g'$, as desired, and thus two different speeds and powers of the traction-engine may be obtained with the speed of piston.

We may sometimes dispense with the small truss-frame L by changing the position of the compensating gearing from the inside to the outside of the frame A, as shown in Fig. 3, in which case the sleeve M, carrying the box O and shaft C, is supported directly by frame B in the same manner as it is supported by the rod $l$ of the small truss-frame L in Figs. 1 and 2. While this plan may be used, we prefer that shown in Figs. 1 and 2, because the main portion of the gearing is inclosed in the frame A.

In order to allow of the movement of the pinion, and yet have a good bearing for the other end of the shaft C, we pivot the box R, (see Fig. 5,) supporting that end of the shaft, upon the sleeve T, by which said box is secured to the frame A, so that the shaft C may be moved laterally without binding in the box R, as would occur if said box were immovable and a good fit for the shaft.

What we claim as new is—

1. The combination, in a traction-engine, of the bevel-wheels I J, the wheel G, carrying a bevel-pinion meshing with said wheels I J, and having two sets of teeth, with a pinion, F, constructed and adapted to mesh with either set of teeth, substantially as described.

2. The combination, in a traction-engine, of the bevel-wheels I J, the wheel G, carrying a bevel-pinion meshing with said wheels I J, and having two sets of teeth, with the pinion F, the shaft C, and the laterally-moving box O, carrying said shaft, substantially as described.

3. The combination, in a traction-engine, of the wheel G, having two sets of teeth and mounted on the shaft D, carrying the pinions K K, with the pinion F, the shaft C, the laterally-moving box O, the sleeve M, carrying said box, and the frame carrying said sleeve, substantially as described.

4. The combination, in a traction-engine, of the wheel G, having two sets of teeth, with the pinion F, the shaft C, carrying said pinion, the laterally-moving box O, the sleeve M, carrying said box, and the small truss-frame L, supporting said sleeve, all substantially as shown and described.

In testimony whereof we affix our signatures in presence of two witnesses.

HENRY D. SMITH.
FRANCIS M. WALKER.

Witnesses:
L. BRADY HARRIS,
JAS. H. SMITH.